US008560326B2

(12) United States Patent
Gao et al.

(10) Patent No.: US 8,560,326 B2
(45) Date of Patent: Oct. 15, 2013

(54) VOICE PROMPTS FOR USE IN SPEECH-TO-SPEECH TRANSLATION SYSTEM

(75) Inventors: Yuqing Gao, Mount Kisco, NY (US); Liang Gu, Mohegan Lake, NY (US); Fu-Hua Liu, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 12/115,205

(22) Filed: May 5, 2008

(65) Prior Publication Data

US 2008/0243476 A1 Oct. 2, 2008

Related U.S. Application Data

(63) Continuation of application No. 11/123,287, filed on May 6, 2005, now abandoned.

(51) Int. Cl.

*G06F 17/28* (2006.01)
*G06F 17/20* (2006.01)
*G10L 21/00* (2013.01)

(52) U.S. Cl.

USPC ................................ 704/277; 704/8; 704/200

(58) Field of Classification Search

USPC ................ 704/1–5, 7–9, 200, 231, 257, 258, 704/270–277, E17.001–E17.003

See application file for complete search history.

(56) References Cited

U.S. PATENT DOCUMENTS 4,974,191 A 11/1990 Amirghodsi et al.
5,493,606 A * 2/1996 Osder et al. ................ 379/88.05
5,694,558 A * 12/1997 Sparks et al. ................ 715/854
5,724,526 A * 3/1998 Kunita ......................... 704/277
5,748,974 A 5/1998 Johnson
5,794,218 A * 8/1998 Jennings et al. ................ 705/35
5,870,701 A 2/1999 Wachtel
5,943,643 A 8/1999 Van De Veen
5,956,668 A 9/1999 Alshawi et al.
6,223,150 B1 4/2001 Duan et al.
6,233,545 B1 * 5/2001 Datig ................................ 704/2
6,266,642 B1 7/2001 Franz et al.
6,327,343 B1 12/2001 Epstein et al.
6,385,583 B1 * 5/2002 Ladd et al. .................... 704/270
6,526,382 B1 * 2/2003 Yuschik ........................ 704/275
6,546,366 B1 * 4/2003 Ronca et al. .................. 704/260
6,553,345 B1 4/2003 Kuhn et al.
6,559,866 B2 * 5/2003 Kolde et al. ................... 715/765
6,615,177 B1 * 9/2003 Rapp et al. .................... 704/277
6,701,294 B1 3/2004 Ball et al.
6,807,529 B2 * 10/2004 Johnson et al. ............ 704/270.1
6,816,578 B1 11/2004 Kredo et al.

(Continued)

*Primary Examiner* — Pierre-Louis Desir
*Assistant Examiner* — David Kovacek
(74) *Attorney, Agent, or Firm* — Anne V. Dougherty; Ryan, Mason & Lewis, LLP

(57) ABSTRACT

Techniques for employing improved prompts in a speech-to-speech translation system are disclosed. By way of example, a technique for use in indicating a dialogue turn in an automated speech-to-speech translation system comprises the following steps/operations. One or more text-based scripts are obtained. The one or more text-based scripts are synthesizable into one or more voice prompts. At least one of the one or more voice prompts is synthesized for playback from at least one of the one or more text-based scripts, the at least one synthesized voice prompt comprising an audible message in a language understandable to a speaker interacting with the speech-to-speech translation system, the audible message indicating a dialogue turn in the automated speech-to-speech translation system.

22 Claims, 3 Drawing Sheets

200

(56) References Cited

U.S. PATENT DOCUMENTS

| | | | | |
|---|---|---|---|---|
| 6,839,670 | B1 | 1/2005 | Stammler et al. | |
| 6,920,425 | B1 * | 7/2005 | Will et al. | 704/275 |
| 6,985,865 | B1 * | 1/2006 | Packingham et al. | 704/275 |
| 7,003,463 | B1 * | 2/2006 | Maes et al. | 704/270.1 |
| 7,062,440 | B2 * | 6/2006 | Brittan et al. | 704/266 |
| 7,275,032 | B2 * | 9/2007 | Macleod | 704/243 |
| 7,343,290 | B2 | 3/2008 | Breuer | |
| 7,373,300 | B1 * | 5/2008 | Bangalore et al. | 704/270.1 |
| 7,412,393 | B1 * | 8/2008 | De Fabbrizio et al. | 704/275 |
| 7,415,100 | B2 * | 8/2008 | Cooper et al. | 379/88.01 |
| 7,539,619 | B1 * | 5/2009 | Seligman et al. | 704/277 |
| 7,711,570 | B2 * | 5/2010 | Galanes et al. | 704/277 |
| 8,301,436 | B2 * | 10/2012 | Wang | 704/9 |
| 2001/0011217 | A1 | 8/2001 | Ammicht et al. | |
| 2001/0013051 | A1 | 8/2001 | Nakada et al. | |
| 2002/0010742 | A1 | 1/2002 | Kihara et al. | |
| 2002/0094067 | A1 | 7/2002 | August | |
| 2002/0156688 | A1 | 10/2002 | Horn et al. | |
| 2002/0161579 | A1 | 10/2002 | Saindon et al. | |
| 2002/0169592 | A1 | 11/2002 | Aityan | |
| 2002/0184373 | A1 * | 12/2002 | Maes | 709/228 |
| 2002/0198722 | A1 * | 12/2002 | Yuschik | 704/275 |
| 2003/0033312 | A1 | 2/2003 | Koizumi et al. | |
| 2003/0046062 | A1 | 3/2003 | Cartus | |
| 2003/0105634 | A1 | 6/2003 | Abella et al. | |
| 2003/0110023 | A1 | 6/2003 | Bangalore et al. | |
| 2003/0120478 | A1 | 6/2003 | Palmquist | |
| 2003/0182111 | A1 * | 9/2003 | Handal et al. | 704/231 |
| 2003/0187641 | A1 | 10/2003 | Moore et al. | |
| 2004/0006480 | A1 * | 1/2004 | Ehlen et al. | 704/276 |
| 2004/0019487 | A1 | 1/2004 | Kleindienst et al. | |
| 2004/0044517 | A1 * | 3/2004 | Palmquist | 704/7 |
| 2004/0122678 | A1 | 6/2004 | Rousseau | |
| 2004/0138890 | A1 * | 7/2004 | Ferrans et al. | 704/270.1 |
| 2004/0183749 | A1 | 9/2004 | Vertegaal | |
| 2004/0199375 | A1 | 10/2004 | Ehsani et al. | |
| 2004/0225499 | A1 * | 11/2004 | Wang et al. | 704/257 |
| 2004/0230434 | A1 * | 11/2004 | Galanes et al. | 704/270.1 |
| 2005/0010418 | A1 * | 1/2005 | McNair et al. | 704/275 |
| 2005/0049874 | A1 | 3/2005 | Coffman et al. | |
| 2005/0131684 | A1 | 6/2005 | Clelland et al. | |
| 2005/0144255 | A1 * | 6/2005 | Hennecke | 709/217 |
| 2005/0187774 | A1 * | 8/2005 | Vuong | 704/277 |
| 2005/0234727 | A1 * | 10/2005 | Chiu | 704/270.1 |
| 2005/0267738 | A1 * | 12/2005 | Wilkinson et al. | 704/9 |
| 2006/0085192 | A1 * | 4/2006 | Davis et al. | 704/257 |
| 2006/0253272 | A1 * | 11/2006 | Gao et al. | 704/2 |
| 2007/0015121 | A1 * | 1/2007 | Johnson et al. | 434/156 |
| 2008/0228484 | A1 * | 9/2008 | Gao et al. | 704/251 |
| 2008/0243476 | A1 * | 10/2008 | Gao et al. | 704/3 |

* cited by examiner

VOICE PROMPTS FOR USE IN SPEECH-TO-SPEECH TRANSLATION SYSTEM

CROSS-REFERENCE TO RELATED APPLICATION(s)

This application is a continuation of U.S. application Ser. No. 11/123,287 filed on May 6, 2005, the disclosure of which is incorporated herein by reference.

This invention was made with Government support under Contract No.: N66001-99-2-8916 awarded by DARPA BABYLON. The Government has certain rights in this invention.

FIELD OF THE INVENTION

This present invention generally relates to speech processing techniques and, more particularly, to techniques for employing voice prompts in a speech-to-speech translation system.

BACKGROUND OF THE INVENTION

Multilingual speech-to-speech language translation systems have been developed to facilitate communication between people that do not share a common language. One example of such a system is the speech-to-speech translation system developed by Carnegie Mellon University (Pittsburgh, Pa.).

A speech-to-speech translation system allows a user who has been trained with the system (hereinafter "system user") to communicate with another person who speaks another language (hereinafter "foreign language speaker" or just "foreign speaker") and is most often not familiar with the system, by providing speech-to-speech translation service between the two parties.

Since conventional speech-to-speech translation systems can handle only one speaker at a time, the two speakers need to take turns during the communication. Therefore, the indication (or prompt) of the switch of turns becomes a very important issue in order to ensure a smooth speech translation multilingual conversation.

Various prompts to indicate the switch of turns exist in conventional speech-to-speech translation systems. The most widely adopted prompt uses audio sound effects such as a beep sound. The sound effects can be language dependent so that a specific sound represents a specific language. The drawback of this approach is that both the system user and the foreign language speaker need to be trained to be familiar with the meaning of these sound effects. For a frequent system user, this brings additional inconvenience, as he or she must remember the meaning of sound effects for each language supported by the system. For a foreign speaker who is not familiar with or has never used this kind of system before, this function is not easily usable for them since the system user cannot explain the function to the foreign speaker because of the language barrier. The foreign speaker needs to guess the meanings of these sounds, often with great frustration and, consequently, with great dissatisfaction.

Another solution is to use visual prompts. The system user can point a microphone associated with the system to himself or herself when he or she starts to talk and point the microphone to the foreign speaker to indicate for the foreign speaker to start to talk. Other visual indications or gestures may be used to indict the switch of the turn. However, visual prompts are only helpful in face-to-face speech translation conversations and are useless for other scenarios such as automatic speech translation through call centers. Additionally, in some situations such as emergency medical care, patients speaking another language may keep their eyes closed due to their medical conditions so that the above-described visual prompts may be completely useless. Furthermore, these visual indications may still be confusing without verbal explanations.

SUMMARY OF THE INVENTION

Principles of the present invention provide techniques for employing improved prompts in a speech-to-speech translation system.

By way of example, in a first aspect of the invention, a technique for use in indicating a dialogue turn in an automated speech-to-speech translation system comprises the following steps/operations. One or more text-based scripts are obtained. The one or more text-based scripts are synthesizable into one or more voice prompts. At least one of the one or more voice prompts is synthesized for playback from at least one of the one or more text-based scripts, the at least one synthesized voice prompt comprising an audible message in a language understandable to a speaker interacting with the speech-to-speech translation system, the audible message indicating a dialogue turn in the automated speech-to-speech translation system.

The technique may also comprise detecting a language spoken by a speaker interacting with the speech-to-speech translation system such that a voice prompt in the detected language is synthesized for playback to the speaker. An initial voice prompt may be synthesized for playback in a default language until the actual language of the speaker is detected.

The technique may also comprise one or more of displaying the at least one voice prompt synthesized for playback, recognizing speech uttered by the speaker interacting with the speech-to-speech translation system, and recognizing speech uttered by a system user of the speech-to-speech translation system. At least a portion of the speech uttered by the speaker or the system user may be translated from one language to another language. At least a portion of the translated speech may be displayed.

In a second aspect of the invention, a technique for providing an interface for use in an automated speech-to-speech translation system, the translation system being operated by a system user and interacted with by a speaker, comprises the following steps/operations. The system user enables a microphone of the translation system via the interface. At least one previously-generated voice prompt is output to the speaker, the at least one voice prompt comprising an audible message in a language understandable to the speaker, the audible message indicating a turn in a dialogue between the system user and the speaker. The speaker, once prompted, utters speech into the microphone, the uttered speech being translated by the translation system.

In a third aspect of the invention, an interface for use in an automated speech-to-speech translation system, the translation system being operated by a system user and interacted with by a speaker, comprises a first field for use by the system user to enable a microphone of the translation system, a second field for use by the system user for at least one of displaying speech uttered by the system user and displaying translated speech uttered by the speaker, and a third field for use by the speaker for at least one of displaying speech uttered by the speaker and displaying translated speech uttered by the system user, wherein the translation system outputs at least one previously-generated voice prompt to the speaker, the at least one voice prompt comprising an audible message in a language understandable to the speaker, the audible message indicating a turn in a dialogue between the system user and the speaker, and the speaker, once prompted, uttering speech into the microphone, the uttered speech being translated by the translation system. The interface may comprise a fourth field for use by the system user to enable a microphone of the translation system such that speech uttered by the system user is captured by the translation system.

In a fourth aspect of the invention, an article of manufacture for use in indicating a dialogue turn in an automated speech-to-speech translation system, comprises a machine readable medium containing one or more programs which when executed implement the steps of obtaining one or more text-based scripts, the one or more text-based scripts being synthesizable into one or more voice prompts, and synthesizing for playback at least one of the one or more voice prompts from at least one of the one or more text-based scripts, the at least one synthesized voice prompt comprising an audible message in a language understandable to a speaker interacting with the speech-to-speech translation system, the audible message indicating a dialogue turn in the automated speech-to-speech translation system.

Accordingly, principles of the invention provide a prompt solution for use in a speech-to-speech translation system that can sufficiently indicate both the switch of dialogue turns and the specific source language for the next turn.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As will be illustratively explained herein, principles of the invention introduce language-dependent voice prompts during machine-mediated automatic speech-to-speech translation.

It is to be understood that while principles of the invention are described as translating from one language to another language, the term "language" can also broadly include a dialect or derivation of a language. That is, language translation may also include translation from one dialect to another dialect.

It is also to be understood that the "system user" is one trained on (or at least operationally familiar with) the speech-to-speech translation system. The system user may also be considered a system operator. The "foreign language speaker" or just "foreign speaker" is one not familiar with or trained on the system. In one example application, the speech-to-speech translation system may be used to allow a customer service representative (i.e., system user) of some business to communicate with a customer (i.e., foreign language speaker), when the two individuals speak different languages.

A voice prompt solution is provided in accordance with principles of the invention that can verbally indicate the switch of the dialogue turns in the language of the foreign speaker by using an automatic language detection algorithm. Such a voice prompt solution is provided with a highly friendly user interface. The voice prompts comprise concise, natural and configurable voice instructions in the foreign language generated by text-to-speech synthesis (TTS) techniques. In a multilingual speech-to-speech translation system with more than two languages involved, the foreign language is determined based on the language detection result of the foreign speaker's speech during one or more previous turns, and with a default foreign language for the first dialogue turn. Therefore, no language selection is required and the system user only needs to click one button to activate the voice prompt for all the foreign language speakers. The user interface of the speech-to-speech translation system is hence very simple and highly convenient.

An illustrative embodiment of a methodology and system for implementing multilingual voice prompts in a speech-to-speech translation system will now be described.

Figure 1:
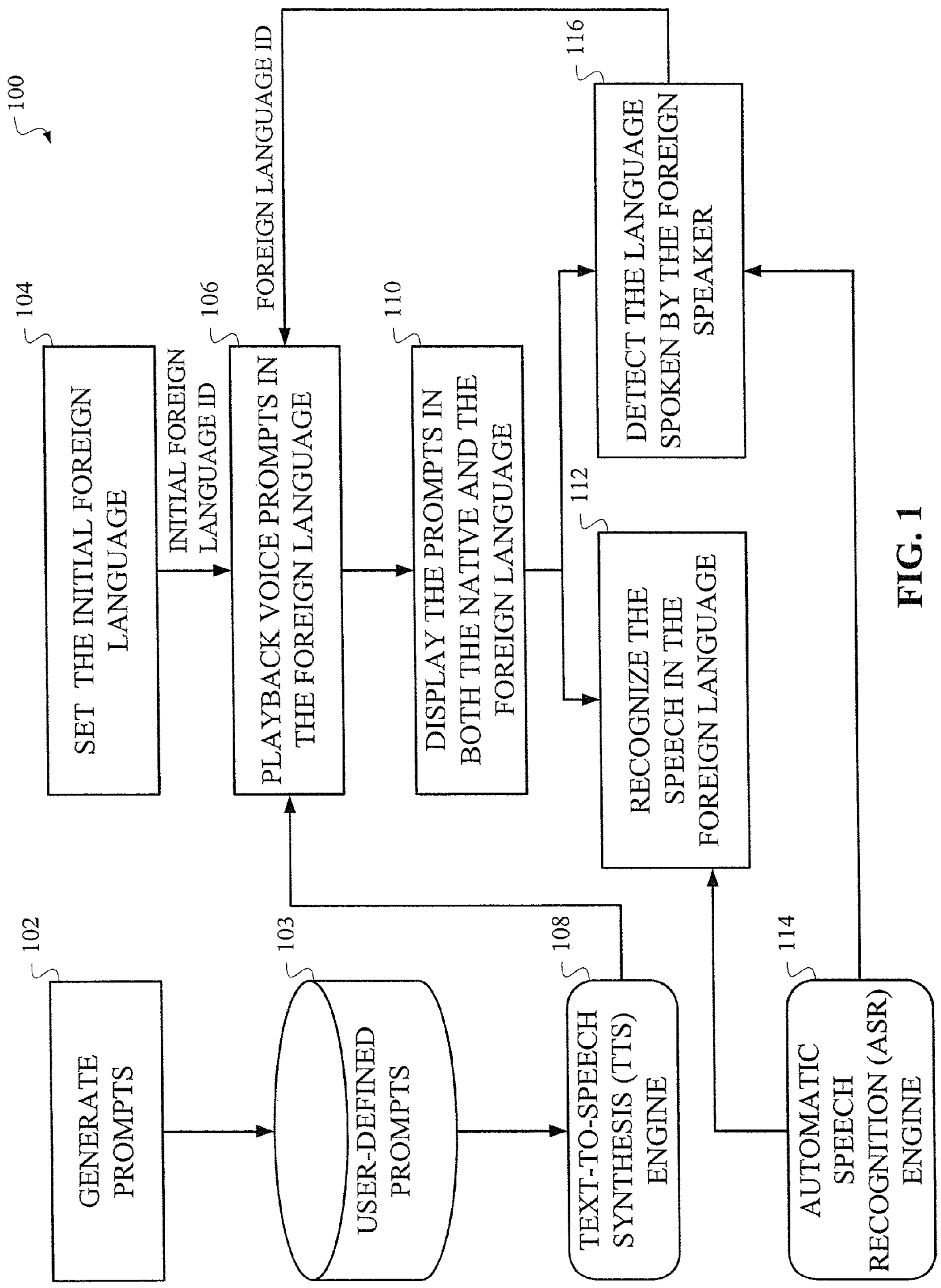
FIG. 1 is a block/flow diagram illustrating a speech-to-speech translation system employing language detection-based multilingual voice prompts, according to an embodiment of the invention.

Referring initially to FIG. 1, a block/flow diagram depicts a speech-to-speech translation system 100 employing language detection-based multilingual voice prompts, according to an embodiment of the invention.

As shown, in step 102, voice prompts are generated in each desired foreign language and stored as respective script or text files (i.e., text-based scripts). A script file storage unit 103 may be used to store the generated prompts. For example, for a Chinese-to-English speech-to-speech translation, the voice prompt "your turn please" is generated in Chinese text as a script file and stored in script file storage unit 103. Any number of voice prompts with various audible messages can be generated and stored in such a manner. Such voice prompts are easily generated and reconfigured since a system user can design preferred prompts by modifying existing prompt script files.

In step 104, an initial or default foreign language is set. This initial language could be a foreign language prevalent in the geographic area of system use, e.g., Chinese or Spanish. The voice prompts in this default language are used at the beginning of the speech-translated system-mediated dialogues.

In step 106, a voice prompt is generated (synthesized) via a text-to-speech synthesis (TTS) engine 108 from a prompt script file and audibly presented (played back) to the foreign speaker via an output speaker associated with the system. The synthesized speech associated with the voice prompt may be generated from the text of the corresponding script file in a manner well known in the art of speech processing. Thus, the well-known automated TTS techniques are not described herein in detail, and the invention is not limited to any particular TTS technique. It is also to be understood that an initial foreign language identifier (ID) can be used to instruct the system as to which foreign language voice prompt to initially select for playback.

In step 110, a text-form message of the played voice prompt is displayed on the system user interface in both the native language of the system and the foreign language as a visual feedback for the system user and the foreign language speaker. An illustrative system user interface will be described below in the context of FIG. 2.

Once prompted (e.g., "your turn please") that it is his or her turn, the foreign speaker will then speak into a microphone of the system. During each turn of the foreign speaker, the speech is recognized (step 112) via an automatic speech recognition (ASR) system 114. Based on the actual speech and/or the recognized speech, in step 116, a language identification algorithm detects the language the foreign speaker is speaking in. It is to be understood that speech may be automatically recognized and the foreign language detected in manners well known in the art of speech processing. Thus, the well-known automated ASR techniques and automated language detection techniques are not described herein in detail, and the invention is not limited to any particular ASR or language detection techniques.

As also shown in step 116, the language detection algorithm used generates an identifier that identifies the language detected by the algorithm. This is provided back to step 106 and replaces the default language identifier. Accordingly, before the dialogue turn switches back again to the foreign speaker, a voice prompt is played to the foreign speaker using the foreign language detected in the previous dialogue turn.

Figure 2:
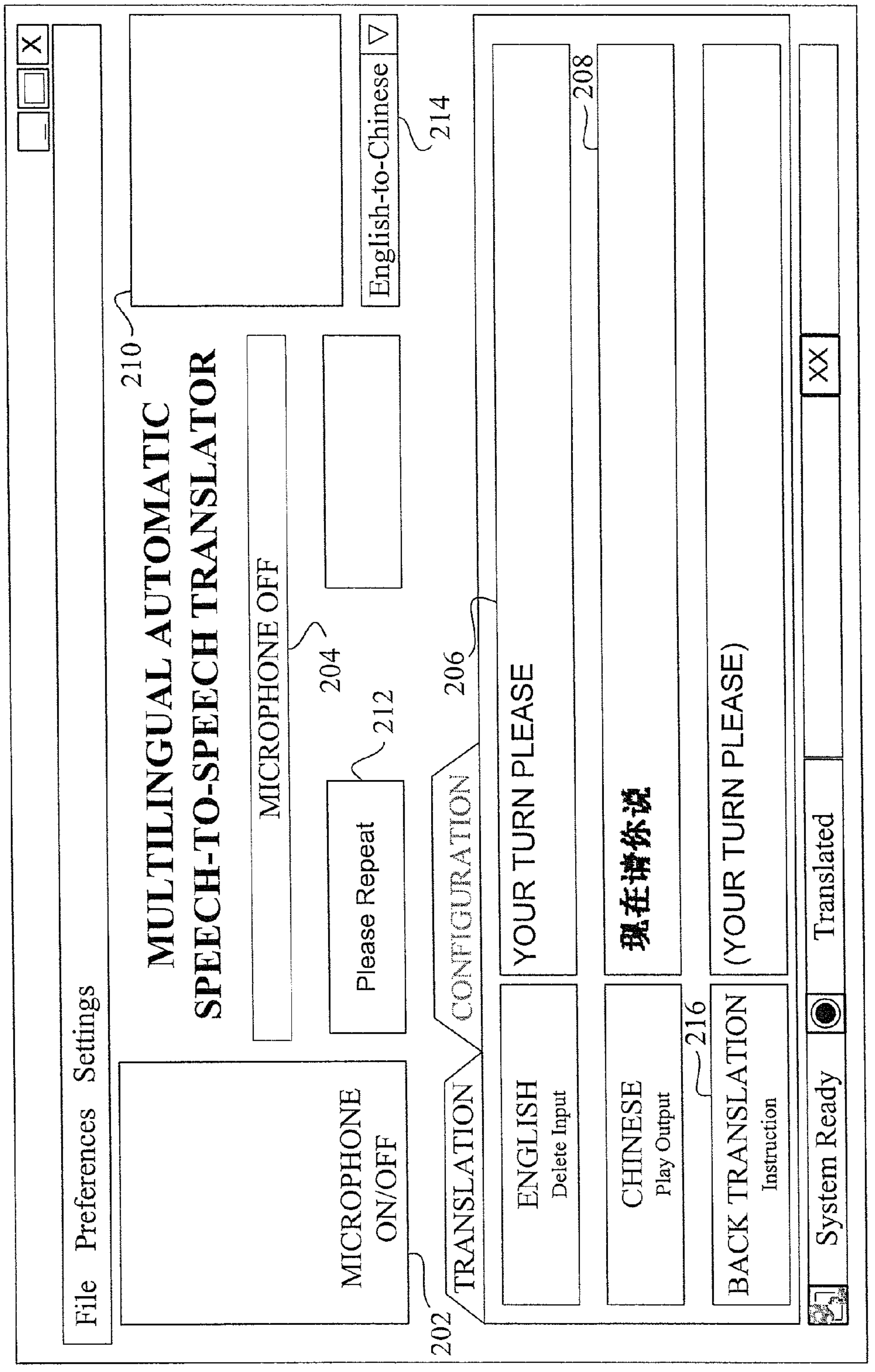
FIG. 2 is a diagram illustrating a speech-to-speech translation system user interface, according to an embodiment of the invention.

Referring now to FIG. 2, an illustrative speech-to-speech translation system user interface 200, according to an embodiment of the invention, is shown. It is to be understood that control of the various buttons (displayed icons on the screen associated with the system) is exercised by the system user, i.e., the person trained to use the system. It is also to be understood that the various buttons, bars and textboxes described below are predefined functional fields within the screen area of the system user interface. Also, any TTS or ASR operations described below are respectively performed by TTS engine 108 and ASR engine 114 described above in the context of FIG. 1.

The system user presses (clicks on) button 202 of the system interface (also referred to as the graphical user interface or GUI) to turn on the system microphone. Voice volume bar 204 appears in the upper-middle part of the GUI page.

An audio prompt (such as a "beep") is played to indicate that the microphone is now on. The system user speaks native language (e.g., English) into the microphone. The recognized speech (recognized via ASR engine 114) is shown in the first textbox 206.

After the user finishes his/her speech and all the speech has been recognized, button 202 is pressed again to turn off the microphone. Voice volume bar 204 indicates that the microphone is off. The recognized message is then translated into the foreign language (e.g., Chinese) using a foreign language translation engine (not shown) and displayed in second textbox 208. It is to be understood that the recognized message may be automatically translated into another language in a manner well known in the art of language translation. Thus, the well-known automated translation techniques are not described herein in detail, and the invention is not limited to any particular language translation techniques. The translated sentence is further played back to the foreign language speaker using TTS techniques (TTS engine 108).

The system user presses button 210 to turn on the microphone (which may be the same microphone used by the system user or a different microphone) and let the foreign speaker speak. A language-dependent voice prompt is played to indicate (in the foreign language speech) that the microphone is now on and ready for speech-to-speech translation. Such a voice prompt may be generated and presented as explained above in the context of FIG. 1. The language of the voice prompt is determined based on the language detection algorithm, as also described above.

In one embodiment, after the language-ID-based voice prompt is played, an audio prompt (such as a beep sound) may also be played to further notify the foreign speaker that the microphone is on and he or she can start to talk. In other words, the voice prompt solution of the invention can be combined with the conventional audio prompt solution to achieve even higher user satisfaction.

The foreign speaker then speaks into the microphone. His or her speech is recognized and displayed in textbox 208. After the foreign speaker finishes his or her speech and all the speech has been recognized, button 210 is pressed again to turn off the microphone. The recognized message is then translated back into the native language (e.g., English) and displayed in textbox 206. The translated sentence is further played back in the native language speech using TTS techniques.

The above steps are considered as one turn of the speech-translation system-mediated dialogue. The native language user (system user) and the foreign language speaker will repeat these steps to communicate with each other until all information has been successfully exchanged.

Also shown in system interface 200 is a button 214 which serves as a short-cut button to playback a voice prompt that says "please repeat" in the detected foreign language. This may be used if the system user or the system itself does not understand what the foreign language speaker has said. Also, a pull-down menu 214 enables the system user to manually select the languages to be used in translation operations (e.g., English-to-Chinese, as shown). Further, button 216 functions as an "instruction" button. When pressed, an instructional voice message is played in the detected foreign language to enable the foreign speaker to get familiar with the system functions and therefore enable a smooth system-mediated speech-to-speech translation.

Figure 3:
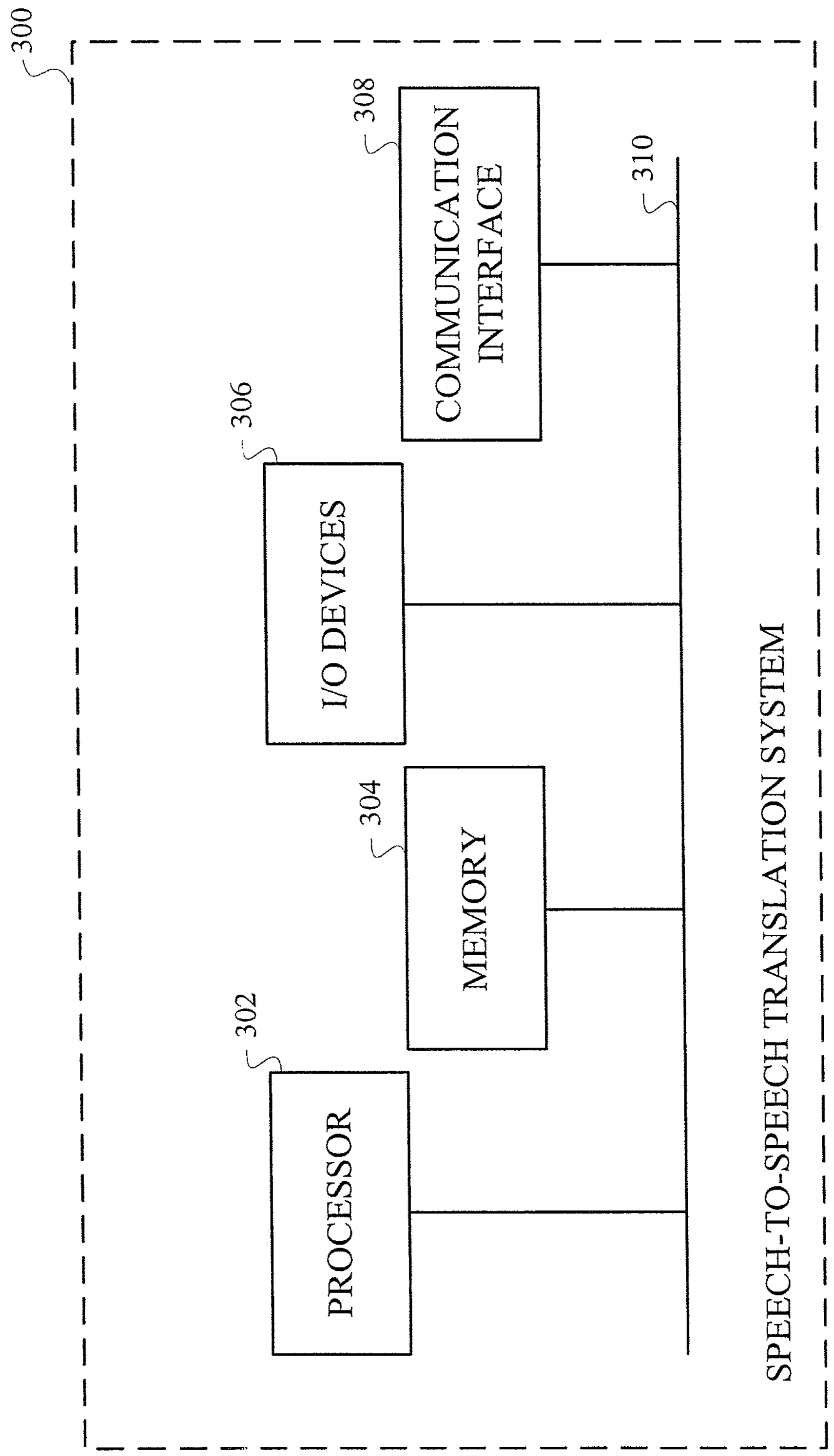
FIG. 3 is a diagram illustrating a computing system in accordance with which one or more components/steps of a speech-to-speech translation system may be implemented, according to an embodiment of the present invention.

Referring finally to FIG. 3, a computing system in accordance with which one or more components/steps of a speech-to-speech translation system (e.g., components and methodologies described in the context of FIGS. 1 and 2) may be implemented, according to an embodiment of the present invention, is shown. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

Thus, the computing system shown in FIG. 3 represents an illustrative computing system architecture for, among other things, a TTS engine, an ASR engine, a language detector, a language translator, and/or combinations thereof, within which one or more of the steps of the voice prompt-based speech-to-speech translation techniques of the invention may be executed.

As shown, the computer system 300 implementing a speech-to-speech translation system may comprise a processor 302, a memory 304, I/O devices 306, and a communication interface 308, coupled via a computer bus 310 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase “input/output devices” or “I/O devices” as used herein is intended to include, for example, one or more input devices (e.g., keyboard, mouse, microphone, etc.) for entering data to the processing unit, and/or one or more output devices (e.g., speaker, display, etc.) for presenting results associated with the processing unit. Thus, I/O devices 306 collectively represent, among other things, the one or more microphones, output speaker, and screen display referred to above. The system interface (GUI) in FIG. 2 is displayable in accordance with such a screen display.

Still further, the phrase “communication interface” as used herein is intended to include, for example, one or more transceivers to permit the computer system to communicate with another computer system via an appropriate communications protocol. That is, if the translation system is distributed (one or more components of the system remotely located from one or more other components), communication interface 308 permits all the components to communicate.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in indicating a dialogue turn in an automated speech-to-speech translation system, comprising the steps of:

translating speech input between a plurality of speakers having a multilingual conversation using an automated speech-to-speech translation system; and providing an indication to each speaker of the plurality of speakers of when it is a turn of each speaker to commence speaking in a dialog interaction between the plurality of speakers and provide speech input to the automated speech-to-speech translation system, wherein providing an indication comprises:

obtaining one or more previously-generated text-based scripts, the one or more text-based scripts being synthesizable into one or more voice prompts in different languages of the plurality of speakers, wherein the voice prompts are audible messages that notify a given speaker when it is a turn of the given speaker for inputting speech to the automated speech-to-speech translation system;

synthesizing for playback at least one of the one or more voice prompts from at least one of the one or more text-based scripts, the at least one synthesized voice prompt comprising an audible message in a language understandable to the given speaker to notify the given speaker when it is a turn of the given speaker for inputting speech to the automated speech-to-speech translation system; and playing the at least one synthesized voice prompt to provide the audible message to the given speaker to notify the given speaker that it is the given speaker’s turn for inputting speech to the automated speech-to-speech translation system.

2. The method of claim 1, further comprising the step of detecting a language spoken by the given speaker interacting with the speech-to-speech translation system such that a voice prompt in the detected language is synthesized for playback to the given speaker.

3. The method of claim 2, wherein an initial voice prompt is synthesized for playback in a default language until the actual language of the given speaker is detected.

4. The method of claim 1, further comprising the step of displaying text of the at least one voice prompt synthesized for playback.

5. The method of claim 1, further comprising the step of recognizing speech uttered by the given speaker interacting with the automated speech-to-speech translation system.

6. The method of claim 1, wherein the plurality of speakers include a system user that operates the automated speech-to-speech translation system and a foreign language speaker that interacts with the automated speech-to-speech translation system.

7. The method of claim 6, wherein at least a portion of the speech uttered by the foreign language speaker or the system user is translated from one language to another language.

8. The method of claim 7, further comprising displaying text of at least a portion of the translated speech.

9. A method of providing an interface for use in an automated speech-to-speech translation system, the automated speech-to-speech translation system being operated by a system user and interacted with by a foreign language speaker, the method comprising the steps of:

translating speech input between the foreign language speaker and the system user having a multilingual conversation using the automated speech-to-speech translation system; and utilizing an interface of the automated speech-to-speech translation to provide an indication to the foreign language speaker of when it is a turn of the foreign language speaker to commence speaking in a dialog interaction with the system user and provide speech input to the automated speech-to-speech translation system by the foreign language speaker, wherein utilizing an interface comprises:

the system user enabling a microphone of the automated speech-to speech translation system via the interface;

synthesizing at least one previously-generated text-based scripts into a voice prompt for playback to the foreign language speaker, the voice prompt comprising an audible message in a language understandable to the foreign language speaker to notify the foreign language speaker when it is a turn of the foreign language speaker to input speech to the automated speech-to-speech translation system;

playing the audible message to the foreign language speaker to notify the foreign language speaker that is the foreign language speaker’s turn for inputting speech to the automated speech-to-speech translation system; and receiving speech uttered into the microphone by the foreign language speaker for translation by the automated speech-to speech translation system.

10. The method of claim 9, further comprising the step of displaying text in a first field of the interface representing translated speech uttered by the system user.

11. The method of claim 10, further comprising the step of displaying text in a second field of the interface representing translated speech uttered by the speaker.

12. An apparatus for use in indicating a dialogue turn in an automated speech-to-speech translation system, comprising:

a memory; and at least one processor coupled to the memory and operative to: (i) translate speech input from a plurality of speakers having a multilingual conversation using an automated speech-to-speech translation system; (ii) provide an indication to each speaker of the plurality of speakers of when it is a turn of each speaker to commence speaking in a dialog interact between the plurality of speakers and provide speech input to the automated speech-to-speech translation system, wherein the at least one processor is operative to provide an indication by:

obtaining one or more previously-generated text-based scripts, the one or more text-based scripts being synthesizable into one or more voice prompts in different languages of the plurality of speakers, wherein the voice prompts are audible messages that notify a given speaker when it is a turn of the given speaker for inputting speech to the automated speech-to-speech translation system;

synthesizing for playback at least one of the one or more voice prompts from at least one of the one or more text-based scripts, the at least one synthesized voice prompt comprising an audible message in a language understandable to the given speaker to notify the given speaker when it is a turn of the given speaker for inputting speech to the automated speech-to-speech translation system; and playing the at least one synthesized voice prompt to provide the audible message to the given speaker to notify the given speaker that it is the given speaker's turn for inputting speech to the automated speech-to-speech translation system.

13. The apparatus of claim 12, wherein the at least one processor is further operative to detect a language spoken by the given speaker interacting with the speech-to-speech translation system such that a voice prompt in the detected language is synthesized for playback to the given speaker.

14. The apparatus of claim 13, wherein an initial voice prompt is synthesized for playback in a default language until the actual language of the given speaker is detected.

15. The apparatus of claim 12, wherein the at least one processor is further operative to display text of the at least one voice prompt synthesized for playback.

16. The apparatus of claim 12, wherein the at least one processor is further operative to recognize speech uttered by the given speaker interacting with the speech-to-speech translation system.

17. The apparatus of claim 16, wherein the plurality of speakers includes a system user that operates the speck-to-speech translation system and a foreign language speaker.

18. The apparatus of claim 17, wherein at least a portion of the speech uttered by the foreign language speaker or the system user is translated from one language to another language.

19. The apparatus of claim 18, wherein at least a portion of the translated speech is displayed as text.

20. An interface for use in an automated speech-to-speech translation system, the automated speech-to-speech translation system being operated by a system user and interacted with by a foreign language speaker, the interface comprising:

a display to display a graphical user interface of the automated speech-to-speech translation system, wherein the graphical user interface comprises:

a first field for use by the system user to enable a microphone of the automated speech-to-speech translation system;

a second field for use by the system user for at least one of displaying text of speech uttered by the system user and displaying text of translated speech uttered by the foreign language speaker; and a third field for use by the foreign language speaker for at least one of displaying text of speech uttered by the speaker and displaying text of translated speech uttered by the system user;

wherein the automated speech-to-speech translation system synthesizes for audible output at least one previously-generated voice prompt to the foreign language speaker in a language understandable to the foreign language speaker to notify the foreign language speaker when it is a turn of the foreign language speaker for inputting speech to the automated speech-to-speech translation system, and wherein the automated speech-to-speech translation system receives speech uttered into the microphone by the foreign language speaker for translation by the automated speech-to-speech translation system.

21. The interface of claim 20, the graphical user interface further comprising a fourth field for use by the system user to enable a microphone of the automated speech-to-speech translation system such that speech uttered by the system user is captured by the automated speech-to-speech translation system.

22. An article of manufacture for use in indicating a dialogue turn in an automated speech-to-speech translation system, comprising a non-transitory computer readable storage medium containing one or more programs which when executed implement the steps of:

translating speech input between a plurality of speakers having a multilingual conversation using an automated speech-to-speech translation system; and providing an indication to each speaker of the plurality of speakers of when it is a turn of each speaker to commence speaking in a dialog interaction between the plurality of speakers and provide speech input to the automated speech-to-speech translation system, wherein providing an indication comprises:

obtaining one or more previously-generated text-based scripts, the one or more text-based scripts being synthesizable into one or more voice prompts in different languages of the plurality of speakers, wherein the voice prompts are audible messages that notify a given speaker when it is a turn of the given speaker for inputting speech to the automated speech-to-speech translation system;

synthesizing for playback at least one of the one or more voice prompts from at least one of the one or more text-based scripts, the at least one synthesized voice prompt comprising an audible message in a language understandable to the given speaker to notify the given speaker when it is a turn of the given speaker for inputting speech to the automated speech-to-speech translation system; and playing the at least one synthesized voice prompt to provide the audible message to the given speaker to notify the given speaker that it is the given speaker's turn for inputting speech to the automated speech-to-speech translation system.

* * * * *